(12) United States Patent
Hill et al.

(10) Patent No.: US 8,880,541 B2
(45) Date of Patent: Nov. 4, 2014

(54) QUALIFICATION OF WEBSITE DATA AND ANALYSIS USING ANOMALIES RELATIVE TO HISTORIC PATTERNS

(75) Inventors: Alex T. Hill, Pleasant Grove, UT (US);
John Vandermay, Draper, UT (US);
Brett Michael Error, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 1365 days.

(21) Appl. No.: 12/044,655

(22) Filed: Mar. 7, 2008

(65) Prior Publication Data

US 2014/0244572 A1    Aug. 28, 2014

Related U.S. Application Data

(63) Continuation of application No. 11/945,023, filed on Nov. 26, 2007, now abandoned.

(60) Provisional application No. 60/867,392, filed on Nov. 27, 2006.

(51) Int. Cl.
*G06F 7/00* (2006.01)
*G06F 17/30* (2006.01)

(52) U.S. Cl.
USPC ........................ 707/758; 705/14.41

(58) Field of Classification Search
USPC ............... 705/14.41, 14.42, 14.47; 707/758, 707/999.001
See application file for complete search history.

(56) References Cited

U.S. PATENT DOCUMENTS

| | | | |
|---|---|---|---|
| 7,020,622 B1 | 3/2006 | Messer | |
| 7,065,534 B2 | 6/2006 | Folting et al. | |
| 7,610,276 B2 * | 10/2009 | Yomtobian | 1/1 |
| 7,657,626 B1 * | 2/2010 | Zwicky | 709/224 |
| 7,752,301 B1 * | 7/2010 | Maiocco et al. | 709/224 |
| 7,933,984 B1 * | 4/2011 | Smith et al. | 709/224 |
| 8,027,876 B2 * | 9/2011 | Taylor | 705/14.49 |
| 8,494,950 B2 * | 7/2013 | Kostic et al. | 705/37 |
| 2002/0049687 A1 | 4/2002 | Helsper et al. | |
| 2002/0099649 A1 | 7/2002 | Lee et al. | |
| 2002/0128959 A1 * | 9/2002 | Kostic et al. | 705/37 |
| 2002/0184570 A1 * | 12/2002 | Etgen | 714/42 |
| 2004/0103024 A1 | 5/2004 | Patel et al. | |
| 2004/0138858 A1 | 7/2004 | Carley | |
| 2004/0190448 A1 | 9/2004 | Fishteyn | |
| 2004/0230491 A1 | 11/2004 | Messer et al. | |
| 2005/0144065 A1 | 6/2005 | Calabria et al. | |
| 2005/0144067 A1 | 6/2005 | Farahat et al. | |
| 2005/0262240 A1 | 11/2005 | Drees et al. | |

(Continued)

OTHER PUBLICATIONS

Michael Bloch et al, "How to Defend Your Website Against Click Fraud", 2004.*

(Continued)

*Primary Examiner* — Brannon W Smith
(74) *Attorney, Agent, or Firm* — Kilpatrick Townsend & Stockton LLP

(57) ABSTRACT

Tools and techniques are provided to assist detection of invalid clicks in website activity data. A system calculates or otherwise obtains a historic click quality characterization based on historic web analytics data. The system then identifies a click quality anomaly in the website activity data, namely, a departure from the historic click quality characterization. The identified anomalies may then be used to help guide searches for invalid clicks.

13 Claims, 3 Drawing Sheets

(56) References Cited

U.S. PATENT DOCUMENTS

| | | | |
|---|---|---|---|
| 2006/0010105 | A1 | 1/2006 | Sarukkai et al. |
| 2006/0026060 | A1 | 2/2006 | Collins |
| 2006/0085408 | A1 | 4/2006 | Morsa |
| 2006/0136294 | A1 | 6/2006 | Linden et al. |
| 2006/0200555 | A1 | 9/2006 | Shannon et al. |
| 2007/0073579 | A1* | 3/2007 | Immorlica et al. ............. 705/14 |
| 2007/0100993 | A1 | 5/2007 | Malhotra et al. |
| 2007/0185855 | A1* | 8/2007 | Shah et al. ........................ 707/5 |
| 2007/0271352 | A1* | 11/2007 | Khopkar et al. ............. 709/217 |
| 2008/0004937 | A1* | 1/2008 | Chow et al. ..................... 705/10 |
| 2008/0004955 | A1* | 1/2008 | Mathew et al. ................ 705/14 |
| 2008/0010166 | A1* | 1/2008 | Yang et al. ...................... 705/26 |
| 2008/0052278 | A1* | 2/2008 | Zlotin et al. ..................... 707/3 |
| 2008/0114624 | A1* | 5/2008 | Kitts ................................. 705/7 |
| 2008/0255944 | A1* | 10/2008 | Shah et al. ..................... 705/14 |
| 2013/0179253 | A1* | 7/2013 | Ranka et al. ............. 705/14.43 |

OTHER PUBLICATIONS

S. Bartlett Boughton, "Search Engine Marketing", 2005, St. Edward's University, Perspectives on Business, pp. 29-33.*

Net Applications, "Using Web Analytics to Identify Possible Click Fraud", 2005, pp. 1-7.*

Young-Hoon Park et al, "Modeling Browsing Behavior at Multiple Websites", 2004, Marketing Science, vol. 23, No. 3, pp. 280-303.*

Click Quality Team, "How Fictitious Clicks Occur in Third-Party Click Fraud Audit Reports", Aug. 8, 2006, Google Inc., pp. 1-17.*

Eric Peterson, "The Big Book of Key Performance Indicators", Jan. 1, 2006.*

Blizzard Associate, "How High is Your Bounce Rate?", Feb. 9, 2006, available online: http://web.archive.org/web/20060325203646/http://newsletter.blizzardinternet.com/how-high-is-your-bounce-rate/2006/02/09/.*

Regelson et al, "Predicting Click-Through Rate Using Keyword Clusters", 2006.*

Mark J. Nigrini, "I've Got Your Number", AICPA Journal of Accountancy, www.aicpa.org/pubs/jofa/may1999/nigrini.htm, May 1999.

David Berkowitz, "Demystifying Click Fraud", www.promotionworld.com/news/news/050322clickfroudexplainedppc.html, Mar. 22, 2005.

Brian Grow et al., "Click Fraud", BusinessWeek online, from www.businessweek.com, Oct. 2, 2006.

U.S. Appl. No. 11/458,313, filed Jul. 18, 2006, all pages.

"Advertisement System, Method and Computer Program Product," IP.com, Document ID IPCOM000138557D, Jul. 24, 2006, pp. 0-38.

* cited by examiner

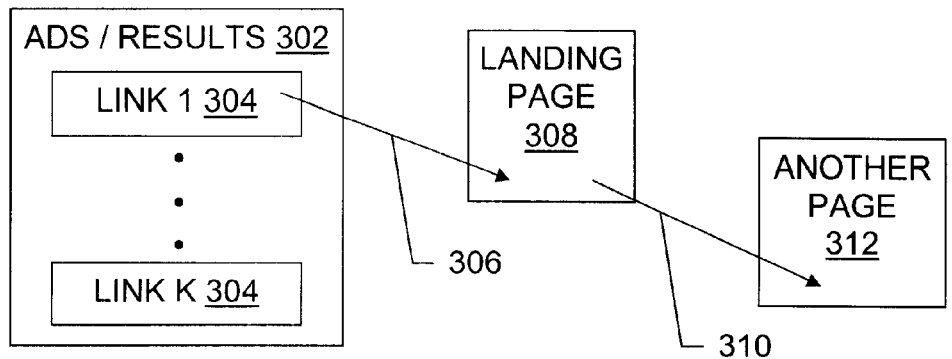
Fig. 3
| Tracking Code | Clickthroughs | | Total CTs | | Click Past | | CTQ | Click Fraud | |
|---|---|---|---|---|---|---|---|---|---|
| 1. 456 | 1 | 33.33% | 12 | 40% | 2 | 16.7% | 17% | 1 | 100.0% |
| 2. ABC | 1 | 33.33% | 10 | 33% | 6 | 50.0% | 60% | 0 | 0.0% |
| 3. 123 | 1 | 33.33% | 8 | 27% | 4 | 33.3% | 50% | 0 | 0.0% |
| Total | 3 | | 30 | | 12 | | n/a | 1 | |
— 402
Fig. 4
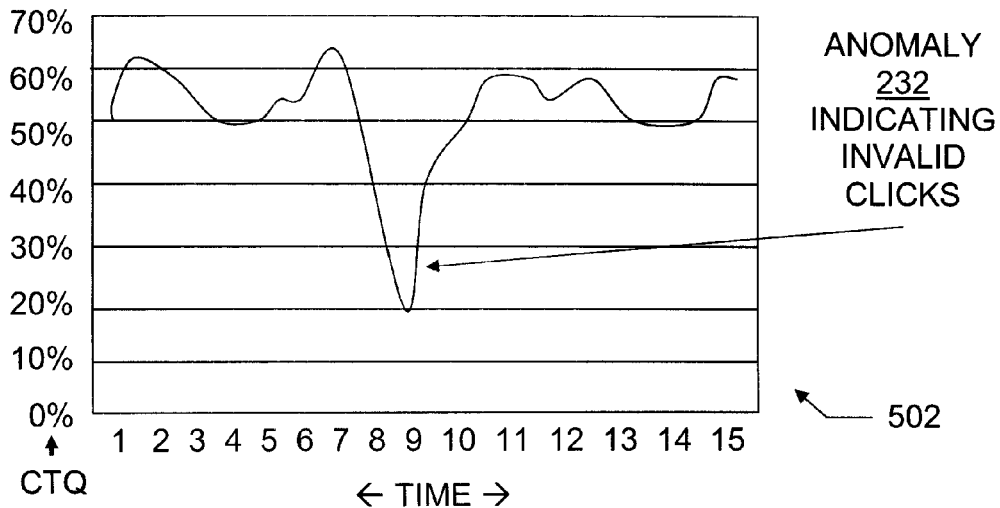
Fig. 5

QUALIFICATION OF WEBSITE DATA AND ANALYSIS USING ANOMALIES RELATIVE TO HISTORIC PATTERNS

RELATED APPLICATION

The present application is a continuation of application Ser. No. 11/945,023 filed Nov. 26, 2007, now abandoned which claims priority from U.S. provisional patent application Ser. No. 60/867,392, filed Nov. 27, 2006, both of which are incorporated by reference herein in their entirety.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Web Analytics Generally

Web analytics tools and techniques can collect information about website visitors so that the website owner may better understand and serve those visitors. Website usage via browsers is regularly tracked and analyzed by commercially available web analytics services, which gather detailed data about web page usage, and to some extent about particular website users. Entities which provide other entities with web analytics services are referred to as "analytics providers". One leading web analytics provider is Omniture, Inc., of Orem, Utah, the owner of the present invention. Omniture provides web analytics technology under its well-known mark SiteCatalyst™. All other marks used herein are property of their respective owners.

Web analytics data can be collected from server logs or by using web-beacons. Web-beacons are small image requests placed in a web page to cause communication between the user's device and a server. The server may be controlled by the analytics provider, by the vendor whose website contains the web-beacons, or by another party. Web-beacons are also known as clear GIFs, web bugs, image requests, or pixel tags. Web-beacons can be used for advertising, behavioral targeting, and other processes, to gather information about visits to websites. Web-beacons are commonly used by analytics providers to gather analytics data on behalf of their customers.

Some cell phones and other wireless devices can be configured with a web browser, RSS feed aggregator, and/or other tools for accessing web and/or other internet content without requiring the use of a browser running on an end-user's personal computer. Examples include cell phones, other mobile phones, wireless devices such as those sold under the Blackberry mark, personal digital assistants such as those sold under the Palm mark, and/or other devices, including handheld devices and others. Such wireless web devices communicate with a wireless gateway using one or more wireless communication protocols such as WAP, J2ME, I-mode, LEAP, EZWeb, and J-SkyWeb. The wireless gateway communicates in turn with the web using one or more internet protocols such as HTTP, HTTPS, XML, and RSS, among others.

Some typical web-beacon-based web analytics products can track visitor information about a served web page by executing JavaScript code on that page that constructs a web-beacon request (usually a transparent 1×1 GIF with name-value pairs) which is sent to the designated web analytics servers. The analytics servers then collect the information from the web-beacon request, serve the GIF to the browser client and process that data for consumption by the analytics provider's customer. This data collection activity is performed by the analytics provider at the customer's request; the customer in at least some best practice approaches discloses this data collection activity to the visitor in their privacy policy. Browser clients on wireless devices may involve additional steps in the process. In one scenario, for instance, a wireless device sends a WAP request to a WAP gateway/proxy, which sends an HTTP request to an origin server. The origin server sends an HTTP response to the WAP gateway/proxy, which then sends a WAP response to the wireless device.

Qualification of Website Data Generally

Google, Yahoo, and other entities provide or facilitate pay-per-click ("PPC") advertising in their search engines. They help advertisers display ads on a network, which a consumer can click on to learn more about an offer or about a vendor. If such ads are displayed in response to keywords or other indicia that indicate the consumer's present interests, then the ads can be more relevant. This provides an important service, since it helps decrease time spent by consumers dealing with ads for products or services they are not interested in, and it helps decrease money spent on ads that do not help generate revenue for the vendor whose product or service is advertised.

However, fraudulent clickthroughs undermine the advantages and effectiveness of PPC advertising. Some fraudulent clickthroughs take the form of clicking repeatedly on a competitor's ad after the ad is presented by Google, Yahoo!, MSN, AOL, or another search engine advertising service provider, in order to make the competitor incur advertising costs without receiving a true website visitor and/or corresponding sales. Some fraudulent clickthroughs take the form of clicking repeatedly on one's own ad (or one's intended beneficiary's ad), to make the interest in the advertised product or service appear greater than would be the case if a fair and scientific sampling were taken of the consumer population in question. Some fraudulent clickthroughs are performed directly by humans, while other fraudulent clickthroughs are performed automatically by programs such as bots, clickbots, or hitbots. "Bot" is a technical term, derived from "robot", which is applied to programs or other software that automates (partially or fully) one or more tasks that are sometimes performed more directly by people. Fraudulent clickthroughs and other invalid clicks are also known as "phantom" clicks.

Other concepts related to the present invention may be known, or become apparent through sources other than this background, including without limitation the references being made of record in connection with the present patent application.

SUMMARY

The present invention provides tools and techniques to assist detection of invalid clicks in website activity data. Some embodiments obtain a historic click quality characterization based on historic web analytics data, and then identify a click quality anomaly in the website activity data, namely, a departure from the historic click quality characterization. The identified anomalies may then be used to help guide searches for invalid clicks.

The historic click quality characterization may measure instances in which a website visitor clicks at least one page past a landing page of a campaign, for example. In some embodiments, attention is paid to whether a visitor clicks at least N pages past a campaign landing page, with N being a specified value greater than one. N may be specified in relation to a stated average visit page depth and/or length of the website, for instance. The historic click quality characterization may measure (a) instances in which a website visitor clicks at least one page past a landing page of a campaign, relative to (b) a value indicating total clickthroughs to the website. In some embodiments, the historic click quality characterization is based at least in part on a measure of instances in which a website visitor clicks through to at least one campaign landing page at least R times in a row without also clicking at least M pages past the campaign landing page, where R is greater than one and M is at least one.

An anomaly may be identified based on a spike in clicks to the website reported by a search engine without a corresponding spike reported by a web analytics system that is tracking visits to the website, for example, and/or based on a statistically significant change in campaign effectiveness and/or by a statistically significant departure from any of the historic click quality characterizations discussed herein. Some embodiments provide a time granularity control that is capable of specifying website activity data time frames, with click data qualification code that is capable of searching for a click quality anomaly within website activity data for a specified time frame. Some provide an indication that relates website traffic level to a level of confidence that an identified anomaly actually reflects invalid clicks.

These examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

FIG. 3 is a block diagram illustrating search results and/or pay-per-click advertisements, with hyperlinks and destination website pages, as an environment in which a visitor may perform a clickthrough and/or click past activity; such activities may be analyzed according to at least one embodiment of the present invention.

FIG. 4 is a simplified screen display further illustrating the methods and systems of FIGS. 1 and 2, showing a mock user interface table report of clickthrough quality and related analytic data, according to at least one embodiment of the present invention.

FIG. 5 is another simplified screen display further illustrating the methods and systems of FIGS. 1 and 2, showing a mock user interface graph report of clickthrough quality over time, according to at least one embodiment of the present invention.

Figure 1:
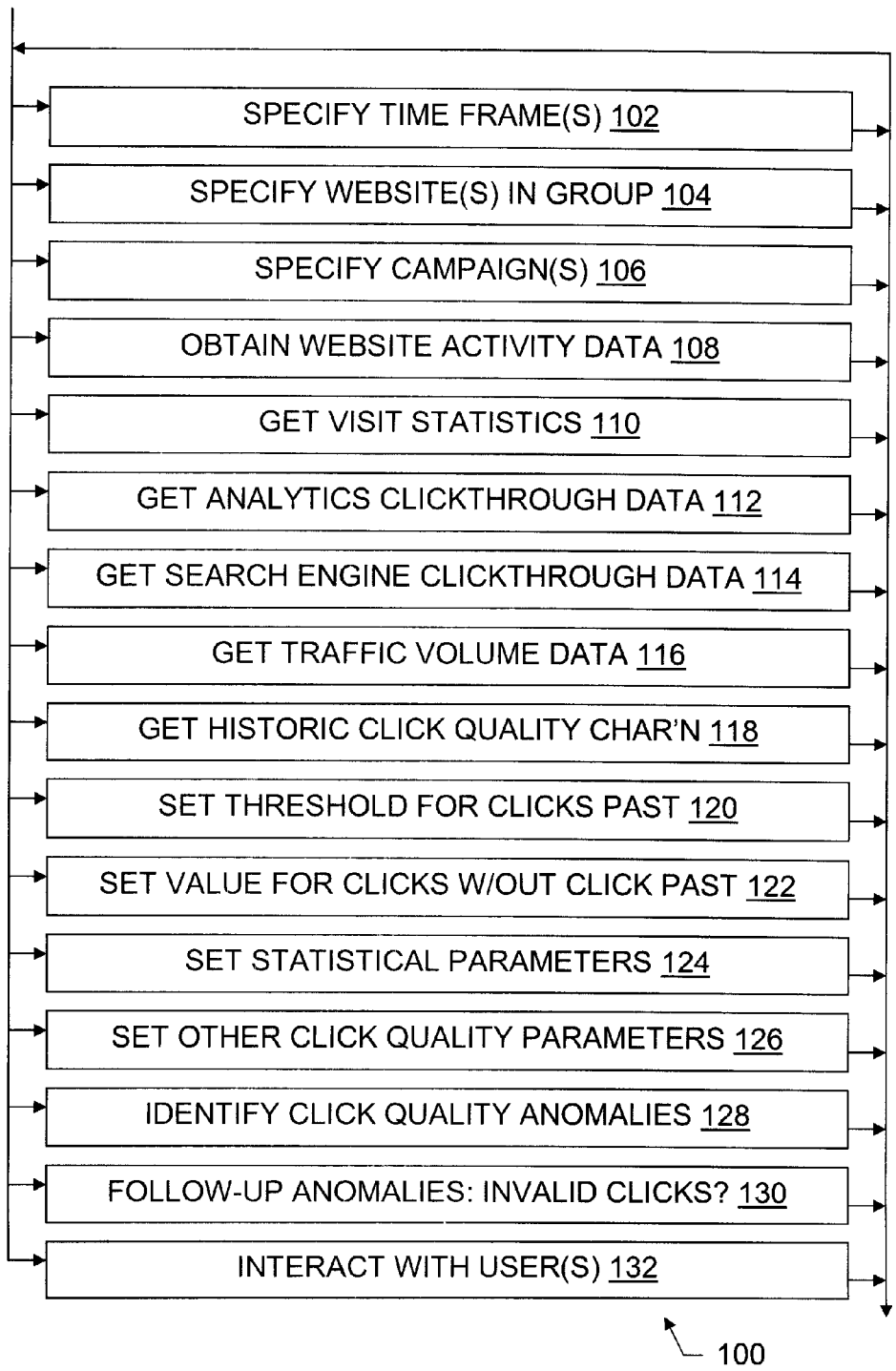
FIG. 1 is a flow chart illustrating methods of analyzing website data to identify anomalies that may indicate invalid click activity, according to at least one embodiment of the present invention.

Reference numerals to the Figures are included within the text below, but the reader is invited to initially read through the text without referring to the Figures each time a reference numeral occurs, in order to more easily gain a first impression of the present invention.

DETAILED DESCRIPTION

Introduction

The present invention provides tools and techniques to help detect invalid clicks by identifying significant departures from historic norms for click quality. The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

It is not necessary for every inventive embodiment or configuration to include every component shown in the figures or discussed in the text, or to include components in the same quantities and relationships shown here. The figures and textual descriptions are merely examples. Apparent inconsistencies in pieces of text used near a reference numeral should be understood as presenting alternatives, thereby broadening the meaning of the referenced item. Also, a section of text may discuss an item without reciting that item's reference numeral.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to be their own lexicographers, with respect to both coined terms and other terms.

For instance, "analytics" is used somewhat broadly herein. Analytics technology generates and/or gathers data about visitor behavior in websites, including in some cases web page visits, Flash (mark of Adobe) or other multimedia presentation interactions, RSS or other feed interactions, and/or other visitor behavior during networked presentations, in a manner similar to widely used HTML web page analytics. Some embodiments of the invention help detect invalid clicks by using web analytics data.

Also, with respect to clickthrough and click past, "page" should be understood to include not merely HTML web pages but also other destinations a visitor can reach by clicking on a link in a web page. Thus, in the context of visitor click activity, pages may be HTML pages, RSS or other feeds, Flash or other multimedia presentations, and so on.

The terms "ad" and "advertising" are used broadly herein. For instance, no money need change hands, and hence popularity contests and other interest surveys are a type of "advertising" for the present purposes. Advertising of products or services for sale or barter may be denoted "sales advertising". Thus, an ad might advertise consumer electronics, books, legal services, political views, religious beliefs, homes, business services, chat or other social interaction opportunities, opportunities to take action regarding social issues, and/or many other things; a sales ad could advertise some of those things but leads to a website which offers items or services for sale in exchange for payment (cash, credit card, check, etc., or barter).

Similarly, "clicking" or "selecting" includes not merely pressing a mouse button when a cursor controlled by a mouse is positioned over a specific clickable link, but also covers other forms of selecting a displayed choice, regardless of the action taken in response to user selection of that choice. For example, other I/O devices could be used, such as a touchscreen, keyboard or keypad, button, voice input, and so on, to select a hyperlink. Also, the displayed choice need not have an associated hyperlink in every instance, but may instead be a menu choice, a button, a slider, a check box, or another graphical user interface ("GUI") element for taking, preventing, or declining some action, to give some examples.

Overview

One perspective on the invention follows. The invention is not limited to the specific example given here, or limited to features stated in this section of the present disclosure. The perspective is that of a web analytics provider, such as Omniture and/or another licensed or otherwise authorized vendor. However, the invention can be used as well, or as an alternative, by end-users, web page content providers, web analytics provider partners, and/or by entities in other roles familiar to those of skill in the web analytics art.

Customers of web analytics providers spend a large amount of money on paid search marketing with Google, Yahoo, MSN, and other search engines (trademarks of their respective owners). A common model is for the search engine to charge the customer per clickthrough. The intentional inflation of clickthroughs to either increase the amount charged to a competing entity or to increase one's own ranking has been referred to as "click fraud" or "click spamming". Click spamming has been a problem for some time, in which people manually or through bots/agents are clicking paid search advertisements to artificially run up clicks and the amounts companies pay for their clicks. Click spamming or similar activities result in invalid clicks, namely, invalid traffic.

Omniture's published U.S. patent publication no. 20070100993, entitled "Assessment of Click or Traffic Quality" and Omniture's TrueClick™ service feature can help a company deal with invalid clicks by using technology to provide alerts and reports on suspicious keyword activity based on thresholds defined by the company. Armed with this information, marketers can determine if the suspicious activity is the result of good marketing efforts or if some level of invalid clicks is occurring. With this feature, companies can defend their brands, phrases, and keywords from potential invalid click activity while increasing ROI. However, additional indications of invalid clicks could also be useful.

Some embodiments of the present invention look for and detect behavior indicating invalid clicks. There are at least two sources of invalid clicks, both of which can potentially be detected with this solution, namely, people committing invalid clicks and non-human agents committing invalid clicks.

Consider first the problem of people committing invalid clicks. To track invalid clicks by humans it is helpful to monitor the number of times a specific visitor clicks through on a specific paid search word or entire campaign. Some existing attempts to detect invalid clicks merely look at total clickthroughs on a campaign; if there are multiple clickthroughs from the same person that is considered an indicator of invalid clicks. A problem with this is that after a visitor clicks through, that visitor may reload the landing page, which would count as another clickthrough. Similarly, a visitor may click one page forward and then hit the back button back to the landing page, which would likewise count as another clickthrough. Thus, total clickthroughs is not by itself a good enough indicator of invalid clicks.

Instead, some embodiments of the present invention track or otherwise use another metric, which is termed "click past". This measured event flag or counter will get set or incremented when a visitor 246 clicks past a landing page 308 of a campaign to a next page or pages 312. In some embodiments, a click past variable does not get set/incremented on each subsequent page, only on the first page after the landing page.

In some embodiments, clicking one page past the landing page will set the click past flag, while in other embodiments setting the click past flag requires going N levels beyond the landing page, with N greater than 1. The concept of going N levels deep when visiting a website may be referred to as "visit page depth." Web analytics services from Omniture can track average page depth of visits to a website as part of website activity data 228; this statistic may be captured on the backend of SiteCatalyst$^{SM}$ services, for example. Average page depth can be used as a threshold for setting the click past flag or counter. In some embodiments, visit page depth would not be used to trigger a click past, but could be used instead of click past to measure click quality. Other visit metrics tracked in website activity data 228 can be used similarly. For example, in some embodiments, an average visit page length is used instead of, or in addition to, average visit page depth. Average visit page length is the average number of pages visited within the website before leaving it, regardless of the depth of those pages relative to a landing page.

FIG. 3 illustrates clickthrough and click past. In this example, a clickthrough 306 takes a visitor 246 from a link 304 in pay-per-click ads or in search engine results 302 to a website landing page 308. From the landing page 308 another click operates in this example as a click past 310 to take the visitor past the landing page to a deeper page 312 of the website.

Thus, clickthrough activity may be characterized using at least two metrics: (i) total clickthroughs, which may include all the reloads and back button inflation (and actual true clickthroughs from the referring site), and (ii) click past. A given embodiment can use code 234 to calculate a value, based at least in part on one or both of these two clickthrough metrics, to characterize clickthrough quality. A ratio or other formula may be used to combine clickthroughs and click past, for example. The level of website traffic for which the clickthrough quality is being assessed can also be factored in, or at least be displayed 132 to the embodiment's user 202 in conjunction with the clickthrough quality assessment, as higher traffic levels will perhaps tend to give more stable and reliable indications of clickthrough quality.

Some embodiments determine a percentage as a characterization of "clickthrough quality" (CTQ, or CT quality). Different embodiments may calculate the percentage in different ways, e.g., by including reloads or not. In general, however, the percentage indicates the relative amount of likely valid visits, assuming that clickthroughs without clicks past represent visits that are more likely invalid. Each campaign leading visitors to a website will generally have its own clickthrough quality percentage; see, e.g., table 402 in FIG. 4, which illustrates a report that clients (embodiment users) 202 may be able to view showing each campaign's clickthrough quality.

Some marketers may want all campaigns to have a 100% clickthrough quality, meaning that every time a user clicks through from a campaign, they move on past the landing page to a subsequent page. This may be considered ideal by some, but it is generally not realistic. Clickthrough quality for a successful campaign may be lower, e.g., somewhere around 60%. However, the numbers given here do not limit every embodiment; clickthrough quality will likely be very dependant on the campaign and most specifically on the landing page.

A campaign may have multiple landing pages. Set up properly, an embodiment (or a web analytics system 238, 240 that provides data analyzed by the embodiment) may flag a visit to any of the specified landing pages as a click through to a campaign regardless of the particular landing page of the campaign that is hit 306. Visits monitored for invalid traffic could begin on any of the specified 106 landing pages.

A clickthrough quality value in and of itself does not necessarily tell us anything about invalid click activity. The mere fact that one campaign has a relatively low 10% clickthrough quality doesn't mean it has invalid clicks, and the mere fact that another campaign has a relatively high 75% CT quality does not mean it is free of invalid clicks. Rather, embodiments of the invention utilize historic web analytics data and search for departures from historic patterns to flag possible instances of invalid clicks. Departures may be defined in terms of absolute data, percentage change, standard deviations, probability of change given past behavior, and/or as any statistically significant variation from a historic norm.

In some embodiments, it is important to monitor the CT quality over time. For example, if a campaign has a 60% CT quality for a couple of weeks, then it drops suddenly down to 20% or something much lower, then goes back up to 60% again, that is a very good indicator that something abnormal happened to cause that blip, and what happened could be invalid click activity. Changes to CTQ could also result from changes to the landing page content or layout, changes in the text or other creative content of the ad that the visitor 246 clicked on to get to the website, and/or a substantive change in the offer presented to the visitor. All of these changes could result in a change to the click through quality over time. However, a sharp and distinct change from the historically normal levels followed by a return to those normal levels is believed to be more likely a result of invalid click activity; changes in the content of an ad or a landing page may result in a change in CTQ but such changes are not likely to also cause a return to the previous CTQ. Such blips may show up well on a chart like the CTQ graph 502 shown in FIG. 5. Graph 502 plots CT quality over time. Although a downward spike is shown, invalid clicks may also be indicated by an upward spike, or by other departures from what is historically present for a given variable over a period that lacked substantial invalid clicks.

Bearing this overview in mind, we now turn to a more detailed discussion of various aspects of some embodiments of the present invention.

Methods and More

Flowchart 100 in FIG. 1 illustrates methods for identifying click anomalies that may correspond with invalid clicks. It is not necessary that every click anomaly identified by a given embodiment lead investigators to a corresponding invalid click event. Some embodiments may simply help narrow the search for invalid clicks; this can be helpful even without a one-to-one correspondence between identified anomalies and invalid clicks. As indicated by the flowchart arrows in FIG. 1, a given embodiment need not include every step of the flowchart 100 shown in the Figure, and steps may be performed in a different order than the order laid out in the Figure. Steps may also be repeated, renamed, grouped differently, and otherwise depart from the Figure. In short, FIG. 1 and the other Figures do not override normal claim interpretation procedures for understanding patent claims; the Figures are meant instead to assist an understanding of the claimed invention.

During a time frame specifying step 102, a user 202 may use an interface 214 to specify one or more time frames 236 in which to search 128 for click quality anomalies 232. Time frames may also be specified automatically, e.g., as defaults, or as values derived from the context of the user's other interactions within a larger system. Some embodiments combine clickthrough quality tracking and analysis with server-side processing. For example, a time-parting Omniture VISTA rule or another web analytics data management mechanism could be adapted or provided to break a clickthrough quality report down into thirty-minute segments or one hour segments. This may help the user see how the clickthrough quality is changing in specified granular time frames. More generally, some embodiments include a time granularity component 236 that allows the analyst or other user 202 to specify the time periods (start-end, granularity) for which a clickthrough quality, clicks past, and/or other variable is tracked and reported.

During a website specifying step 104, a group 226 of one or more websites 242 is specified. This may be done directly by the user 202 through the interface 214, or it may be done by a default mechanism or a context-importing mechanism, for example. Web analytics data 228 for visits to the specified 104 website(s) 242 will then be used by code of the embodiment in an attempt to identify 128 click quality anomalies 232 that may indicate invalid clicks.

In some embodiments, and with all participant permissions obtained, the historic data 228 used as a baseline for detecting departures comes from a group of two or more websites 242. For example, the websites specified 104 may satisfy one or more of the following conditions: the websites are in the same industry as each other, the websites belong to direct competitors, the websites target substantially the same purchaser demographics, the websites belong to vendors who have a retail location in the same country as each other, the websites belong to vendors who have a retail location in the same state as each other, the websites belong to vendors who have a retail location in the same metropolitan area as each other, the websites belong to vendors who are each a member of a specified trade organization.

During a campaign specifying step 106, a group 226 of one or more marketing campaigns is specified. In general, a campaign is any ad, paid search, banner, email campaign, or other presentation mechanism that is not on a website 242 and that is designed/intended to drive people to the website for a specific purpose. The website owner could use several of these mechanisms, or only one, according to their discretion and how they allocate their marketing funds. Clicks on free search results (also called natural search results) may be part of a campaign for present purposes, even if clicks do not cost the website owner any money, because invalid clicks may be used to improperly change the apparent popularity of a site, which may (but need not) in turn have financial consequences. The campaign may be specified 106 directly by the user 202 through the interface 214, or it may be done by a default mechanism or a context-importing mechanism, for example. Web analytics data 228 for visits to the landing page(s) of the specified campaign(s) 226 will then be used in an attempt to identify 128 click quality anomalies that may indicate invalid clicks. A given campaign may have one or more landing pages 308 on one or more websites 242, which the visitor 246 reaches by a clickthrough 306 from a link 304 in an online/email ad 302, for instance.

During a website activity data obtaining step 108, an embodiment obtains web analytics data 228, such as visitor characteristics and behavior statistics, timestamps, and possibly data on when landing pages were modified. The web analytics data can be largely or entirely obtained from an analytics server 238 and/or from website 242 server logs.

During a visit statistics obtaining step 110, an embodiment obtains average visit page depth, average visit page length, average distribution of visits between different landing pages in a campaign, and/or other statistics based on raw web analytics data. In some embodiments, some or all of these statistics may be provided during step 108 as part of the web analytics data, while in other cases these averages are computed by click data qualification code 234 from raw analytics data 228.

During an analytics clickthrough data obtaining step 112, an embodiment obtains data on clickthroughs 306 to landing page(s) 308 as part of a specified campaign, from the perspective of the website that contains the landing page(s). In some embodiments, some or all of the clickthrough data may be provided during step 108 as part of the web analytics data, while in other cases the clickthrough data are extracted from raw analytics data 228, e.g., from web server 242 logs.

During a search engine clickthrough data obtaining step 114, an embodiment obtains data on clickthroughs 306 to landing page(s) 308 as part of a specified campaign from the perspective of the search engine that places the ads 302 or the search results 302. In the case of PPC ads, this will reflect the advertising fees being charged to the website 242 owner. This data will generally be provided to the website owner by the PPC vendor, e.g., the search engine provider.

During a traffic volume data obtaining step 116, an embodiment obtains data on the volume of traffic to the website 242. The data may be provided by a web analytics server, by a search engine service, or both.

During a historic click quality characterization obtaining step 118, an embodiment calculates or otherwise obtains a historic click quality characterization. The value may be retrieved if already calculated, or it may be calculated by the click data qualification code 234. As used here, "historic" merely means that at least some past period is included; the term "historic" does not necessarily exclude periods that encompass the present moment or the most recent data available. "Click quality" refers to any one or more of the measures of click quality discussed herein, e.g., the ratio of clicks past as a percentage of total clickthroughs, or some other measure of click quality over the historic period in question. In some embodiments, clickthrough quality is calculated as: 1−((total clickthroughs—clicks past)/total clickthroughs). "Characterization" is used here as a reminder that click quality (aka clickthrough quality) can be measured in various ways, even within a single embodiment, as discussed herein. Except as otherwise clearly indicated, the terms "click quality", "click quality characterization", "clickthrough quality", "clickthrough quality characterization", "CT quality", and "CTQ" are used interchangeably in this document.

In some embodiments, visit page depth or length, or landing page popularity, and/or another visit statistic is factored in or otherwise made part of the calculation of clickthrough quality. Unlike a simple one-page click past, the current value of a visit statistic is not readily ascertainable by unauthorized personnel. Thus, these statistics lend themselves to use as thresholds for separating valid visits from invalid visits; valid visits tend to meet or exceed the statistic thresholds, while invalid visits do not. In general, for example, deeper page depth corresponds with better clickthrough quality.

During a clicks past threshold setting step 120, an embodiment sets a threshold which is used to determine when a click past has occurred. This threshold may be a programmed-in value not subject to change by users 202, or it may be a default value that users can override, or it may be unknown until it is provided by a user. In the example shown in FIG. 3, the click past threshold is one, namely, a click past 310 occurs when a visitor clicks one page past the landing page 308. In other situations, the threshold may be different. In a given embodiment, the threshold may be set 120, for example, in one of the following ways: as a hop count, so that every click brings a path from the landing page closer to the threshold; as a page length, so that only visits to previously unseen pages 244 after the landing page 308 are counted; as a page depth, so that only pages 244 which are at successively greater depths in the website 242 are counted.

During a running count invalid clicks threshold setting step 122, an embodiment sets a threshold which is used to determine when an invalid click has occurred, based on a sequence of clickthroughs without a click past. An indicator in some embodiments is an invalid clicks flag, namely, an event which gets set when there are ten (for instance) clickthroughs in a row without a click past. The same person has clicked through ten times without clicking past, so the embodiment sets the invalid clicks flag. One can change the threshold up or down from the ten count if desired. More generally, some embodiments set an invalid clicks flag if they detect a sequence of N clickthroughs having M or fewer clicks past, e.g., thirty clickthroughs of which no more than eight had clicks past.

During a statistical parameter setting step 124, an embodiment sets parameters for determinations of statistical significance, e.g., a p-value representing the reliability of results, or the number of standard deviations to be considered a data outlier. Statistical parameters may be hard-coded, or set as defaults, for example.

During a click quality parameter setting step 126, an embodiment sets parameters for assessing click quality. Any of the click-related values and variables discussed herein may be set, including without limitation: the time periods for historic click quality characterization and for the period being investigated for invalid clicks; the values on which to base click quality, e.g., clickthroughs and/or clicks past, and how those values are defined and how they are combined; the website(s) and campaign(s) to examine; the display 132 modes (tables, graphs, etc.) to use; the people to notify 132 of results and how to notify them (display, email, etc.); and so on. These parameters may be input 132 by users, hard-coded, read from configuration files, and/or otherwise set in a manner familiar in web analytics and/or software interface design.

During a click quality anomaly identifying step 128, an embodiment checks website and/or search engine activity data for anomalies 232 that may indicate invalid click activity. For example, click data qualification code 234 may check a history of click quality data for spikes (up and/or down). As noted, a change in click quality is not necessarily an indication of invalid clicks, although it may be. If the change in click quality is temporary, that is generally a stronger indication of invalid click activity, because invalid click activity is also often of relatively short duration to reduce the wrongdoer's perceived risk of being detected.

Some embodiments first analyze 128 the web activity data to determine a baseline pattern. This analysis may be done using curve-fitting techniques, or trend line analysis, for example. The baseline is not necessarily a straight line—it may be sinusoidal, exponential, and/or discontinuous, for example. Then the data outliers, which were discounted or ignored during the baseline determination, are compared 128 with the baseline. If the outliers are far enough from the baseline, as determined by the statistical parameters or by direct user 202 judgments input 132 in response to graphs 132, for example, then they are identified as click quality anomalies 232.

During an anomaly-follow-up step 130, users 202 or other personnel may investigate further to determine whether invalid clicks occurred at the times and websites indicated by one or more anomalies. For instance, they may review server logs to see whether an unusual number of visits originated from a location that is not normally a source of visits. They may also request assistance from their PPC vendor.

Thus, some embodiments include a method to assist detection of invalid clicks in website activity data. Step 118, for example, is used to obtain a historic click quality characterization 222 based on historic web analytics data 228. The website activity data examined contains data from a specified group of one or more websites. Step 128, for example, is used to identify a click quality anomaly 232 in the website activity data, namely, a departure from the historic click quality characterization. The identifying step may identify the anomaly based, for example, at least in part on a spike in clicks to the website reported by a search engine in search engine data 230 without a corresponding spike reported by a web analytics system 238 that is tracking visits to the website. In some cases, the identifying step identifies 128 the anomaly based at least in part on a statistically significant change in campaign effectiveness.

In some cases, the historic click quality characterization measures instances in which a website visitor 246 clicks 310 at least one page past a landing page 308 of a campaign. The campaign may have multiple landing pages 308. In some cases, the visitor 246 clicks at least N pages past a campaign landing page, with N being a specified value greater than one. For example, N may be specified 124 in relation to at least one of: a stated average page depth of visits to the website, a stated average page length of visits to the website, a stated average distribution of visits between different landing pages in a campaign. X specified "in relation to" Y includes cases wherein X is equal in value to Y, X is a rounding or truncation of Y, X is a fixed increment from one of the foregoing values (equal, rounding, truncation), X is a multiple of Y, and other cases where a stated algebraic relationship exists between X and Y.

In some cases, the historic click quality characterization is a ratio or percentage that measures instances in which a website visitor clicks at least one page past a landing page of a campaign relative to a value indicating total clickthroughs to the website for the campaign. In some cases, the historic click quality characterization is based at least in part on a measure 228 of instances in which a website visitor clicks through to at least one campaign landing page at least R times in a row without also clicking at least M pages past the campaign landing page, where R is greater than one and M is at least one.

Configured Media

Some embodiments include a computer-readable storage medium 218 such as a flash memory, CD, DVD, removable drive, hard drive, RAM, ROM, EEPROM, PAL, ASIC, FPGA, or the like, which is configured with code 220 to work in conjunction with a processor 206 to perform a method as discussed herein for identifying possible invalid clicks by locating anomalies 232 in web analytics data. It will be understood that method embodiments and configured media embodiments are generally closely related, in the sense that many methods can be implemented using code that configures a medium, and that many configured media are configured by code which performs a method.

Systems and More

Figure 2:
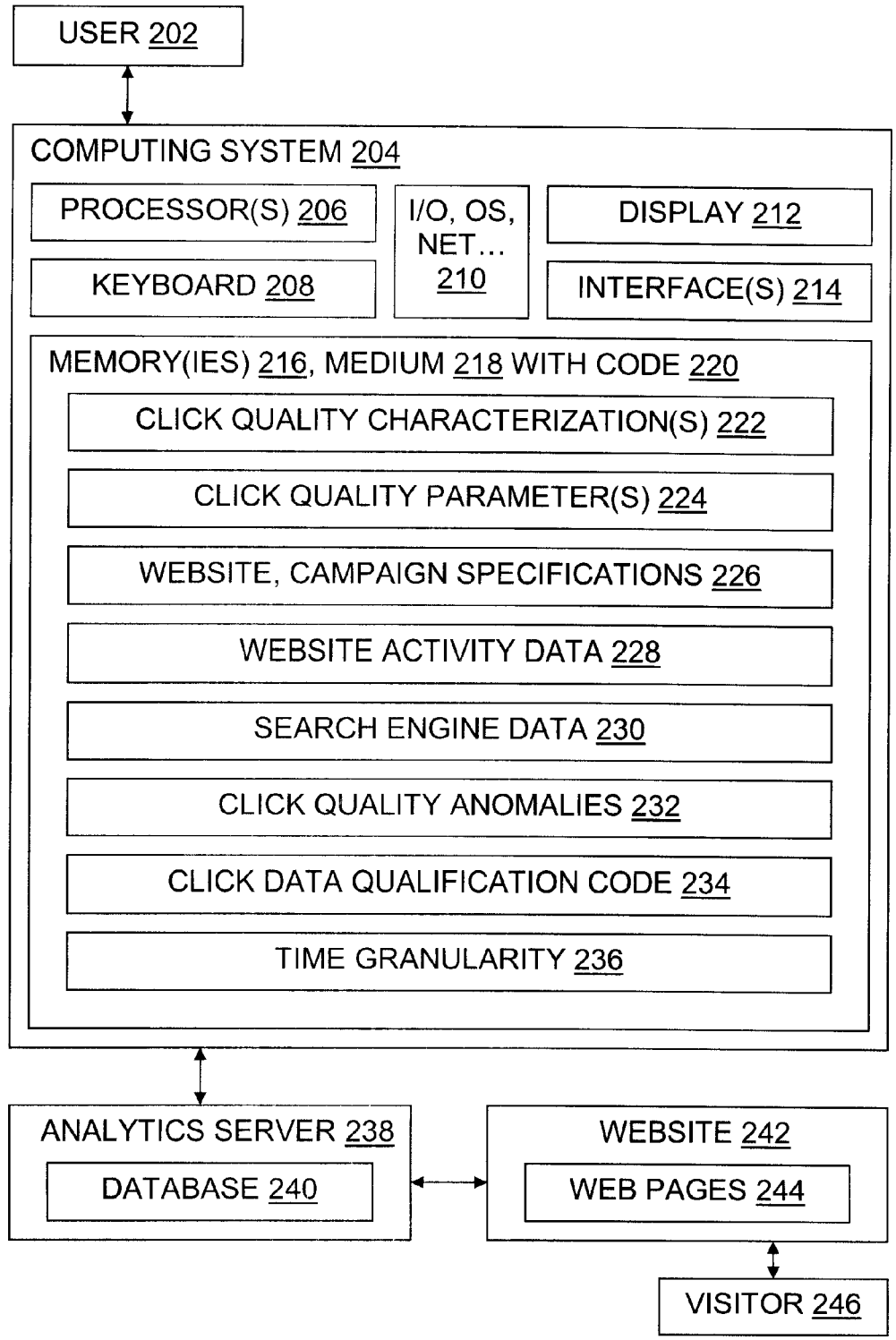
FIG. 2 is a block diagram illustrating systems, data flow, roles, components, and an operating environment according to at least one embodiment of the present invention.

FIG. 2 illustrates system embodiments, as well as further illustrating methods, data used and results produced, and a context for embodiments. As with the other Figures, items depicted in the Figure may be omitted, repeated, grouped differently, and/or renamed (for example) in a given embodiment.

A user 202, such as a web analytics service recipient, interacts 132 with a computing system 204 that is configured with code 220 to perform methods such as those discussed above. The computing system 204 includes one or more processors 206 which operate in communication with various memories 216 (RAM, ROM, disk, removable media, and so on) to provide functionality discussed herein. The illustrated system 204 also has peripherals such as a keyboard 208 and display 212, as part of interfaces 214 with users 202. Other interface 214 hardware and software may communicate with data sources such as a database 240 of web analytics data on a web analytics server 238. Components 210 such as an operating system and networking support are also shown in the illustrated system 204.

Configuring the system 204 are one or more pieces of code 220, "code" being a term which includes digital data structures and/or instructions to guide operation of a processor. The code 220 configures the memory(ies) 216, 218, thereby distinguishing the computing system 204 from systems intended for use(s) other than detection of click quality anomalies as described herein. As with other portions of the Figures, the code 220 shown is illustrative, not definitive, in that a given embodiment may omit, repeat, regroup, and/or rename the code 220 components shown in this Figure.

Bearing this in mind, click quality characterizations 222 may include, for example, ratios of clicks past to clickthroughs, invalid click flags, click quality histories, and other clickthrough quality values obtained 118 as discussed above. Click quality parameters 224 may include, for example, the choice of formula used in calculating a click quality, the choice of parameters used in defining clicks past, and other data analysis choices, as discussed above. Website and campaign specifications 226 may include, for example, the results of specifying 102 time frames, specifying 104 websites 242, and/or specifying 106 campaigns. Website activity data 228 may include clickthrough data obtained by step 112 and in some cases also traffic data obtained by step 116 from the analytics server 238 or the web server 242 logs. Search engine data 230 may include clickthrough data obtained by step 114 and in some cases also traffic data obtained by step 116 from the search engine service provider/PPC vendor. Click quality anomalies 232 may be obtained by step 128, identified either automatically and/or by the user 202 after viewing a clickthrough history such as those shown in FIGS. 4 and 5.

Click data qualification code 234 performs the steps of obtaining a historic click quality characterization based on historic web analytics data, and identifying a click quality anomaly in the website activity data, namely, a departure from the historic click quality characterization, as discussed for example in connection with steps shown in FIG. 1. Time granularity may include code for selecting 102 time frames and for dividing the website activity data 228 and the search engine data 230 (if used) into those time frames for analysis 128. In some embodiments, the time granularity component 236 is part of the click data qualification code 234.

Thus, some embodiments include a data qualification system, with a processor 206, a memory 216 which is interoperable with the processor, a historic click quality characterization 222 based on historic web analytics data 228, and click data qualification code 234 configuring the memory. The code 234 can be executed by the processor to identify 128 a click quality anomaly 232 in the website activity data, e.g., a statistically significant departure from the historic click quality characterization. For example, the click data qualification code may search for anomalies 232 using a clickthrough quality value calculated as 1−((total clickthroughs−click pasts)/total clickthroughs), with a specified parameter 224 determining what constitutes enough of a departure to qualify as an anomaly 232. In some cases, the click data qualification code searches for anomalies based at least on both an average visit page statistic value and a click past value. Some systems include a time granularity control 236 that is capable of specifying website activity data time frames; the click data qualification code 234 is capable of searching for a click quality anomaly within website activity data for a specified time frame. Some systems provide, in an interface 214, an indication that relates website traffic level to confidence that an identified anomaly actually reflects invalid clicks.

Prototype

A prototype of a portion of the invention has been created. Some prototype code is shown below, and an earlier version is given in the underlying provisional patent application 60/867,392 incorporated herein. A sample report produced with prototype code is depicted in FIG. 4. This code runs on a client, using three events and one calculated metric, and is JavaScript- and cookie-based, to monitor the behavior of persons or agents that render JavaScript and accept cookies. But these are not the only features of the invention, and are not necessary features in every embodiment. In particular, it will be appreciated that not every embodiment of the invention includes, or even requires, code running on a client. Some embodiments include code running on servers, such as code running on analytics provider servers and/or on website servers. An embodiment of the invention could be integrated into the SiteCatalyst™ product, for instance.

```
//PLUGIN CODE
//Deobfuscated
var s=this;
if(i<=1){
    var ev=(s.events?s.events+',':'');
    //If the query param exists in the url then...
    if(s.getQueryParam(scp)){
        //Set the total click throughs event
        s.events=ev+tcth_ev;
        //If the click fraud cookie exists then...
        if(s.c_r('cf')){
            //Increment the value in the cookie
            var tct=parseInt(s.c_r('cf'))+1;
            s.c_w('cf',tct,0);
            //If the value of the cookie gets to 10, set the CF
Flag event
            if(tct==cf_th && cff_ev){
                s.events=s.events+',1+cff_ev;
            }
        }
        //If the click fraud cookie doesn't exist yet, then write
it with the value "1"
        else{
            s.c_w('cf', 1, 0);
        }
    }
    //If the campaign variable is not set then...
    else{
        //If the CF cookie exists and is equal to or greater than 1
        if(s.c_r('cf')>=1){
            //reset the cookie to "0"
            s.c_w('cf', 0, 0);
            //Set the click past event
            s.events=ev+cp_ev;
        }
    }
i++;}
```

As a further example, the following prototype code is also provided:

```
/*
  *Plugin: clickThruQuality 0.8
  */
s.clickThruQuality=new
Function("scp","tcth_ev","cp_ev","cff_ev","cf_th"," "
+"var s=this;if(i<=1){var
``` ev=(s.events?s.events+',':'');if(s.getQueryParam(scp))
{s.events=ev+"
+"tcth_ev;if(s.c_r('cf')){var
tct=parseInt(s.c_r('cf'))+1;s.c_w('cf',tct"
+",0);if(tct==cf_th&&cff_ev){s.events=s.events+','+cff_ev;
};}else{s.c_w
('cf',1,0"
+");}}else{if(s.c_r('cf')>=1){s.c_w('cf',0,0);s.events=ev+
cp_ev;}}i++;}
");

Additional Details, Definitions, and Alternatives

With the clickthrough quality and invalid clicks flag discussed above one has two indicators that something abnormal has happened, such as likely invalid clicks behavior. After possible invalid clicks are identified with such indicators, some embodiments do more deep investigation 130 with the Omniture DataWarehouse℠, and/or with a data log from Omniture (for instance) to see other data elements (e.g., geographic region, IP addresses if appropriate consent has been given) to see if they reveal more about what happened. Embodiments may thus provide compelling evidence to the search engine providers, to work with in their own investigation of their logs based on that data. Ideally, search engine or other PPC advertising customers are not charged for invalid clicks, and wrongdoers are identified and dealt with appropriately by the authorities.

In some embodiments, if the visitor 246 clicks through 306 from a campaign to the website 242 then the embodiment:
1) Sets the campaign variable.
2) Sets the "total clickthroughs" event (which may be implemented as a custom event).
3) Keeps track of the number of times the visitor has clicked through consecutively (value="1", "2", etc....).
If the number of times a given visitor has clicked through reaches ten (or another predetermined 122 threshold) then the embodiment sets the invalid clicks flag event; this may be done as a custom event in an Omniture environment.
If the user has not clicked through from a campaign to the website but they did clickthrough on a campaign on the previous page then the embodiment sets the "Click Past" event (e.g., custom event) on the first page after the campaign clickthrough only.

Consider now the need for tracking bots and other non-human agents. Many invalid clicks occur from non-human sources. Bots and agents are programmed to perform clicks to inflate clickthroughs. Because most bots/agents cannot render JavaScript and hence would not be detected by web analytics provider web bug code, one would see a spike in clicks as reported by the search engine but not a corresponding spike as reported by SiteCatalyst™ or another web analytics service. The search engine spikes will return to normal levels for that search word or campaign after the invalid clicks stop. Some embodiments of the invention monitor 128 the percentage of their clicks compared to analytics provider "de-duped clickthroughs" (i.e., only one clickthrough per visit is counted) and watch 128 for major deviations from the mean over time. Large deviations that then return to normal levels are an indicator 232 of invalid clicks and may trigger further analysis 130 of logs for credit of the clicks by the search engine where this has occurred.

Some embodiments search 128 web analytics data for a data anomaly in the form of a statistically significant change (up or down) in clickthrough quality from a historic level of clickthrough quality.

Some embodiments search 128 web analytics data for a data anomaly in the form of a statistically significant change (up or down) in campaign effectiveness from a historic level of campaign effectiveness, as measured, e.g., by actual redemptions, purchases, or subscriptions ordered at the website on which the campaign is centered.

A given clickthrough quality metric may be used as a campaign effectiveness metric; the higher the CTQ percentage, the more effective the campaign. Landing pages with a low CTQ can then be improved or abandoned.

Some embodiments search 128 web analytics data for a data anomaly in the form of a statistically significant and/or predetermined-threshold-passing number of concurrent clickthroughs without a click past.

Some embodiments search 128 web analytics data for a data anomaly in the form of a statistically significant difference between the number of clicks as reported by a search engine 230 and the number of clicks 228 at the same website over the same period as reported by web analytics provider code, e.g., by web bug code.

Anomalies 232 in some embodiments are defined as departure from some value, or from some range of values. In some embodiments, anomalies 232 are defined as departures from some pattern, e.g., from a trend line, or from a sinusoidal pattern.

Anomalies 232 may be detected 128 in some embodiments by using familiar statistical, mathematical, heuristic, artificial intelligence, and/or other tools and techniques that have been adapted for the particular analyses of clickthroughs, click pasts, etc. described herein. Examples of tools and techniques to consider for use in implementing a given code 234 embodiment may include, without limitation, predictive statistical models, probabilistic models, curve fitting, data mining, online analytical processing, calculating deviations, neural nets, pattern detection, frequency analysis, regression, pattern recognition, feature extraction, statistical classifier models, Markov models, and Benford's Law analysis. Not every familiar tool or technique will be suitable for a given embodiment of the present invention, particularly when processing requirements are considered. However, this list illustrates the point that different tools and techniques may be used to find the data anomalies which are of interest herein, e.g., anomalies 232 in clickthrough quality, in click pasts, and/or in other measures of campaign effectiveness. Such anomalies can then be investigated 130 to see if there are other indications of invalid clicks, e.g., an unusually large number of clicks from a geographic location that is not historically productive of substantial orders being placed on the analyzed website.

Computers, PDAs, cell phones, and any device 204 having user interface 214 and in some embodiments (phone/computer) network transmission capabilities may be part of a given embodiment. Touch screens, keyboards, other buttons, levers, microphones, speakers, light pens, sensors, scanners, and other I/O devices 210 may be configured to facilitate or perform operations to achieve the methods and systems, and the method results, which are described here. Combinations of these items may also form a given embodiment.

Terms such as "computerized" refer to devices having at least one microprocessor 206 and at least one memory 216, not merely to personal computers or servers. "Electronic" refers to digital and/or analog electronic circuitry. "Automatic" means without requiring ongoing real-time human input or guidance to perform the immediately contemplated operation.

Although JavaScript is presently used widely, embodiments may also be implemented at least in part in ActionScript, VBScript, C++, Java, XML, Perl, and/or another programming or scripting language, or in a combination of languages, except as otherwise required by operability or claim limitations.

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. Limitations from one embodiment are not necessarily read into another.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools, including without limitation except as expressly required, JavaScript code, as well as other scripting languages, HTML, XML, APIs, SDKs, network protocol stacks, assembly language, firmware, microcode, compilers, debuggers, and/or other languages and tools.

Any website address, and the material on the websites thus addressed, are provided only for background and/or as examples to help illustrate the invention. This document does not incorporate by reference any essential material from such websites.

The embodiments discussed are illustrative of the application for the principles of the present invention. Numerous modifications and alternative embodiments can be devised without departing from the spirit and scope of the present invention.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic. Any apparent inconsistencies in the text associated with a given reference number should be interpreted to broaden to meaning of that reference number.

We claim:

1. A method to assist detection of invalid clicks in network content site activity, the method comprising:
   obtaining first and second historic click quality characterizations for a network content site for respective first and second time periods, wherein each of the first and second historic click quality characterizations is based on a comparison of clickthroughs and clickpasts and is obtained for each of the first and second time periods by:
   receiving a clickpast threshold value that is determined based on at least one of:
   (i) an average page depth of visits during the respective time period,
   (ii) an average page length of visits, and
   (iii) an average distribution of visits among different landing pages in a campaign,
   determining a respective number of clickpasts for at least one content page for the respective time period, wherein each clickpast comprises a respective network content site visit involving clicking a respective number of pages past the at least one content page that is greater than the clickpast threshold value, wherein the respective number of clickpasts comprises at least one of (i) a respective number of unique pages clicked past the at least one content page and (ii) a respective number of successively deeper pages in the network content site clicked past the at least one content page, and comparing the respective number of clickpasts with a respective number of clickthroughs for the at least one content page during the respective time period to obtain the historic click quality characterization; and identifying a click quality anomaly based on a difference between the first and second historic click quality characterizations exceeding at least one of (i) a p-value indicative of a reliability of at least one of the first and second historic click quality characterizations and (ii) a standard deviation for at least one of the first and second historic click quality characterization.

2. The method of claim 1, further comprising determining the clickpast threshold value based on at least two of the average page depth of visits, the average page length of visits, and the average distribution of visits among different landing pages.

3. The method of claim 1, wherein each historic click quality characterization comprises a ratio of the number of clickpasts to the number of clickthroughs.

4. The method of claim 1, wherein each historic click quality characterization is based at least in part on a measure of instances in which a network content site visitor clicks through to at least one campaign landing page at least two subsequent times in a row without also clicking at least one page past the at least one campaign landing page.

5. The method of claim 1, wherein the average page depth of visits comprises an average number of pages clicked beyond the at least one content page of the network content site and the average page length of visits comprises an average number of pages visited in the network content site before exiting the network content site.

6. The method of claim 1, wherein the at least one content page comprises at least one landing page of the network content site that is accessible via the campaign, wherein the campaign comprises electronic content other than a page of the network content site providing a link to the at least one landing page.

7. The method of claim 6, wherein the campaign comprises at least one of a banner, an advertisement, a paid search engine result, and an e-mail communication.

8. A system comprising:
a processor; and
a non-transitory computer-readable medium in communication with the processor,
wherein the processor is configured for executing code stored in the non-transitory computer-readable medium to perform operations comprising:
obtaining first and second historic click quality characterizations for a network content site for respective first and second time periods, wherein each of the first and second historic click quality characterizations is based on a comparison of clickthroughs and clickpasts and is obtained for each of the first and second time periods by:
receiving a clickpast threshold value that is determined based on at least one of:
(i) an average page depth of visits comprising an average number of pages clicked beyond at least one content page of the network content site for visits during the respective time period,
(ii) an average page length of visits comprising an average number of pages visited in the network content site before exiting the network content site, and
(iii) an average distribution of visits among different landing pages in a campaign, determining a respective number of clickpasts for the at least one content page for the respective time period, wherein each clickpast comprises a respective network content site visit involving clicking a respective number of pages past the at least one content page that is greater than the clickpast threshold value, wherein the respective number of clickpasts comprises at least one of (i) a respective number of unique pages clicked past the at least one content page and (ii) a respective number of successively deeper pages in the network content site clicked past the at least one content page, and comparing the respective number of clickpasts with a respective number of clickthroughs for the at least one content page during the respective time period to obtain the historic click quality characterization; and identifying a click quality anomaly based on a difference between the first and second historic click quality characterizations exceeding at least one of (i) a p-value indicative of a reliability of at least one of the first and second historic click quality characterizations and (ii) a standard deviation for at least one of the first and second historic click quality characterizations.

9. The system of claim 8, wherein the operations further comprise determining the clickpast threshold value based on at least two of the average page depth of visits, the average page length of visits, and the average distribution of visits among different landing pages.

10. The system of claim 8, wherein the at least one content page comprises at least one landing page of the network content site that is accessible via the campaign, wherein the campaign comprises electronic content other than a page of the network content site providing a link to the at least one landing page.

11. A non-transitory computer-readable storage medium storing instructions comprising:
instructions for obtaining first and second historic click quality characterizations for a network content site for respective first and second time periods, wherein each of the first and second historic click quality characterizations is based on a comparison of clickthroughs and clickpasts and is obtained for each of the first and second time periods by:
receiving a clickpast threshold value that is determined based on at least one of:
(i) an average page depth of visits comprising an average number of pages clicked beyond at least one content page of the network content site for visits during the respective time period,
(ii) an average page length of visits comprising an average number of pages visited in the network content site before exiting the network content site, and
(iii) an average distribution of visits among different landing pages in a campaign, determining a respective number of clickpasts for the at least one content page for the respective time period, wherein each clickpast comprises a respective network content site visit involving clicking a respective number of pages past the at least one content page that is greater than the clickpast threshold value, wherein the respective number of clickpasts comprises at least one of:
   a respective number of unique pages clicked past the at least one content page; and
   a respective number of successively deeper pages in the network content site clicked past the at least one content page, and
comparing the respective number of clickpasts with a respective number of clickthroughs for the at least one content page during the respective time period to obtain the historic click quality characterization; and
instructions for identifying a click quality anomaly based on a difference between the first and second historic click quality characterizations exceeding at least one of (i) a p-value indicative of a reliability of at least one of the first and second historic click quality characterizations and (ii) a standard deviation for at least one of the first and second historic click quality characterizations.

12. The non-transitory computer-readable medium of claim 11, further comprising program code for determining the clickpast threshold value based on at least two of the average page depth of visits, the average page length of visits, and the average distribution of visits among different landing pages.

13. The non-transitory computer-readable medium of claim 11, wherein the at least one content page comprises at least one landing page of the network content site that is accessible via the campaign, wherein the campaign comprises electronic content other than a page of the network content site providing a link to the at least one landing page.

* * * * *